United States Patent [19]
Chiou et al.

[11] Patent Number: 5,622,771
[45] Date of Patent: Apr. 22, 1997

[54] PENETRATION-RESISTANT ARAMID ARTICLE

[75] Inventors: Minshon J. Chiou; Brian E. Foy, both of Chesterfield, Va.; Louis H. Miner, Kennett Square, Pa.

[73] Assignee: E. I. Du Pont de Nemours and Company, Wilmington, Del.

[21] Appl. No.: 669,655

[22] Filed: Jun. 24, 1996

[51] Int. Cl.⁶ .............................. F41H 1/02; B32B 5/06; B32B 3/10
[52] U.S. Cl. .............. 428/219; 428/172; 428/408; 428/902; 428/911; 428/397; 428/401; 2/2.5; 442/203; 442/239
[58] Field of Search ...................... 428/172, 219, 428/229, 247, 257, 299, 428, 902, 911, 397, 401; 2/2.5

[56] References Cited

U.S. PATENT DOCUMENTS

| | | |
|---|---|---|
| 4,181,768 | 1/1980 | Severin . |
| 4,850,050 | 7/1989 | Droste et al. . |
| 5,035,111 | 7/1991 | Hogenboom et al. . |
| 5,102,389 | 4/1992 | Hauser . |
| 5,266,076 | 11/1993 | Chitrangad et al. . |
| 5,308,689 | 5/1994 | Shinkai et al. . |
| 5,472,769 | 12/1995 | Goerz, Jr. et al. . |

*Primary Examiner*—Richard Weisberger

[57] ABSTRACT

An aramid article is disclosed having improved resistance to penetration by sharp implements. The article is woven with tough, low dtex, aramid yarns of low dtex filaments in a tight plain weave configuration; and, when used in several layers, the layers are not stitched together.

5 Claims, 2 Drawing Sheets

PENETRATION-RESISTANT ARAMID ARTICLE

BACKGROUND OF THE INVENTION

There is a need for protective garments exhibiting improved penetration resistance from sharp pointed implements. However, attention has been directed primarily toward ballistics and toward garments which provide protection from ballistic threats. This invention relates to articles which protect from penetration, such as stabs or thrusts from sharp instruments such as awls or ice picks.

U.S. Pat. No. 5,578,358, issued Nov. 26, 1996 (U.S. Ser. No. 08/421,350, filed Apr. 12, 1995) on the application of Foy and Miner, discloses a penetration resistant article made from tightly woven aramid yarn having a low linear density and a high toughness.

U.S. Pat. No. 5,185,195, issued Feb. 9, 1993 on the application of Harpell et al., discloses a penetration resistant construction wherein adjacent layers of woven aramid or linear polyethylene fabric are affixed together by regular, close, paths. The affixing is preferably by means of stitching.

U.S. Pat. No. 4,850,050, issued Jul. 25, 1989 on the application of Droste et al., discloses a body armor made from laminated layers of aramid fabrics wherein yarns in the fabric are made from filaments with a linear density of less than 1.5 dtex.

SUMMARY OF THE INVENTION

This invention relates to a penetration resistant article consisting essentially of fabric woven to a fabric tightness factor of at least 0.75 from aramid yarn having a linear density of less than 500 dtex, a toughness of at least 30 Joules/gram and filaments in the yarn having a linear density of less than 1.67 dtex. The invention also relates to such a penetration resistant article wherein at least two layers of the fabric are included in the article, and are joined at edges of the article in a manner such that adjacent layers of the fabric are free to move relative to each other.

DETAILED DESCRIPTION

Figure 1:
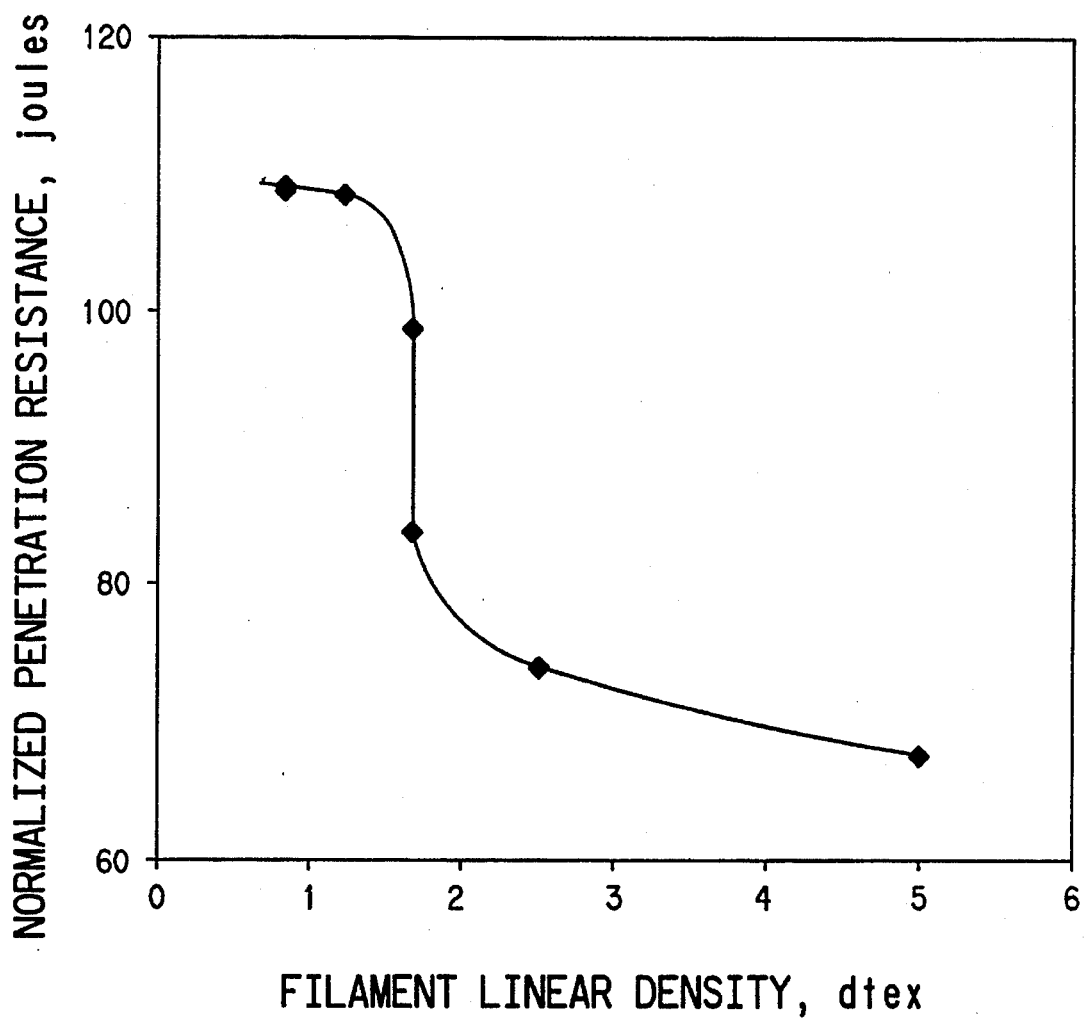
FIG. 1 is a graphical representation of the relationship between linear density for the filaments in yarns used in the fabrics of this invention and penetration resistance of those fabrics.

The protective article of this invention was specially developed to provide protection from penetration by sharp instruments as opposed to protection from ballistic threats. There has been considerable effort expended in the past on improvement of ballistic garments; and many times the assumption has been that improved ballistic garments will also exhibit improved stab resistance or penetration resistance. The inventors herein have found that assumption to be incorrect and they have discovered a fabric article with a combination of several necessary qualities which does, indeed, exhibit improved penetration resistance.

The inventors herein have discovered that the penetration resistance of a fabric article is dramatically improved when yarns used to make the fabric of the article are made with filaments having a linear density of less than about 1.67 dtex. It is believed that filaments of decreased linear density yield fabric articles having reduced interfilament spaces thereby providing a structure which is more difficult to penetrate with sharp instruments.

While ballistic garments are made using several layers of protective fabric and the several layers are nearly always fastened together in a way to hold faces of the adjacent layers in position relative to each other, it has been found that penetration resistance is improved if adjacent layers in a protective garment are not held together; but are free to move relative to each other. When adjacent layers are stitched closely together, penetration resistance is decreased.

The invention herein is constructed entirely of woven fabric without rigid plates or platelets and without matrix resins impregnating the fabric materials. The articles of this invention are more flexible, lighter in weight, softer to the touch, and more pliable than penetration resistant constructions of the prior art offering comparable protection.

Fabrics of the present invention are made from yarns of aramid fibers. By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

Para-aramids are the primary polymers in yarn fibers of this invention and poly(p-phenylene terephthalamide)(PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether. Preparation of PPD-T is described in U.S. Pat. Nos. 3,869,429; 4,308,374; and 4,698,414.

"Fabric tightness factor" and "Cover factor" are names given to the density of the weave of a fabric. Cover factor is a calculated value relating to the geometry of the weave and indicating the percentage of the gross surface area of a fabric which is covered by yarns of the fabric. The equation used to calculate cover factor is as follows (from Weaving: Conversion of Yarns to Fabric, Lord and Mohamed, published by Merrow (1982), pages 141–143):

$d_w$ = width of warp yarn in the fabric
$d_f$ = width of fill yarn in the fabric
$P_w$ = pitch of warp yarns (ends per unit length)
$p_f$ = pitch of fill yarns $$C_w = \frac{d_w}{pw} \quad C_f = \frac{d_f}{pf}$$

Fabric Cover Factor = $C_{fab}$ = $\frac{\text{total area obscured}}{\text{area enclosed}}$ $$C_{fab} = \frac{(p_w - d_w)d_f + d_w p_f}{p_w p_f}$$
$$= (C_f + C_w - C_f C_w)$$

Depending on the kind of weave of a fabric, the maximum cover factor may be quite low even though the yarns of the fabric are situated close together. For that reason, a more useful indicator of weave tightness is called the "fabric tightness factor". The fabric tightness factor is a measure of the tightness of a fabric weave compared with the maximum weave tightness as a function of the cover factor.

$$\text{Fabric tightness factor} = \frac{\text{actual cover factor}}{\text{maximum cover factor}}$$

For example, the maximum cover factor which is possible for a plain weave fabric is 0.75; and a plain weave fabric with an actual cover factor of 0.68 will, therefore, have a fabric tightness factor of 0.91. The preferred weave for practice of this invention is plain weave.

While aramid yarns are available in a wide variety of linear densities, it has been determined that acceptable penetration resistance can be obtained only when the linear density of the aramid yarns is less than 500 dtex. Aramid yarns of greater than 500 dtex, even when woven to a fabric tightness factor of nearly 1.0, are believed to yield between the adjacent yarns and permit easier penetration of a sharp instrument. The improvement in penetration resistance due to low linear density of the yarns can be expected to continue to very low linear densities; but, at about 100 dtex, the yarns begin to become very difficult to weave without damage. With that in mind, the aramid yarns of this invention have a linear density of from 100 to 500 dtex.

The inventors herein have found that fabrics made from yarns with filaments having a linear density less than 1.67 dtex exhibit dramatically improved penetration resistance. Reference is made to the FIG. 1 which is a graphical representation of the data points from the tests performed in Example 1 herein. Each point on the graph represents the test results from one of the fabrics and is located by normalized penetration resistance of the fabric and linear density of the yarn filaments.

Figure 2:
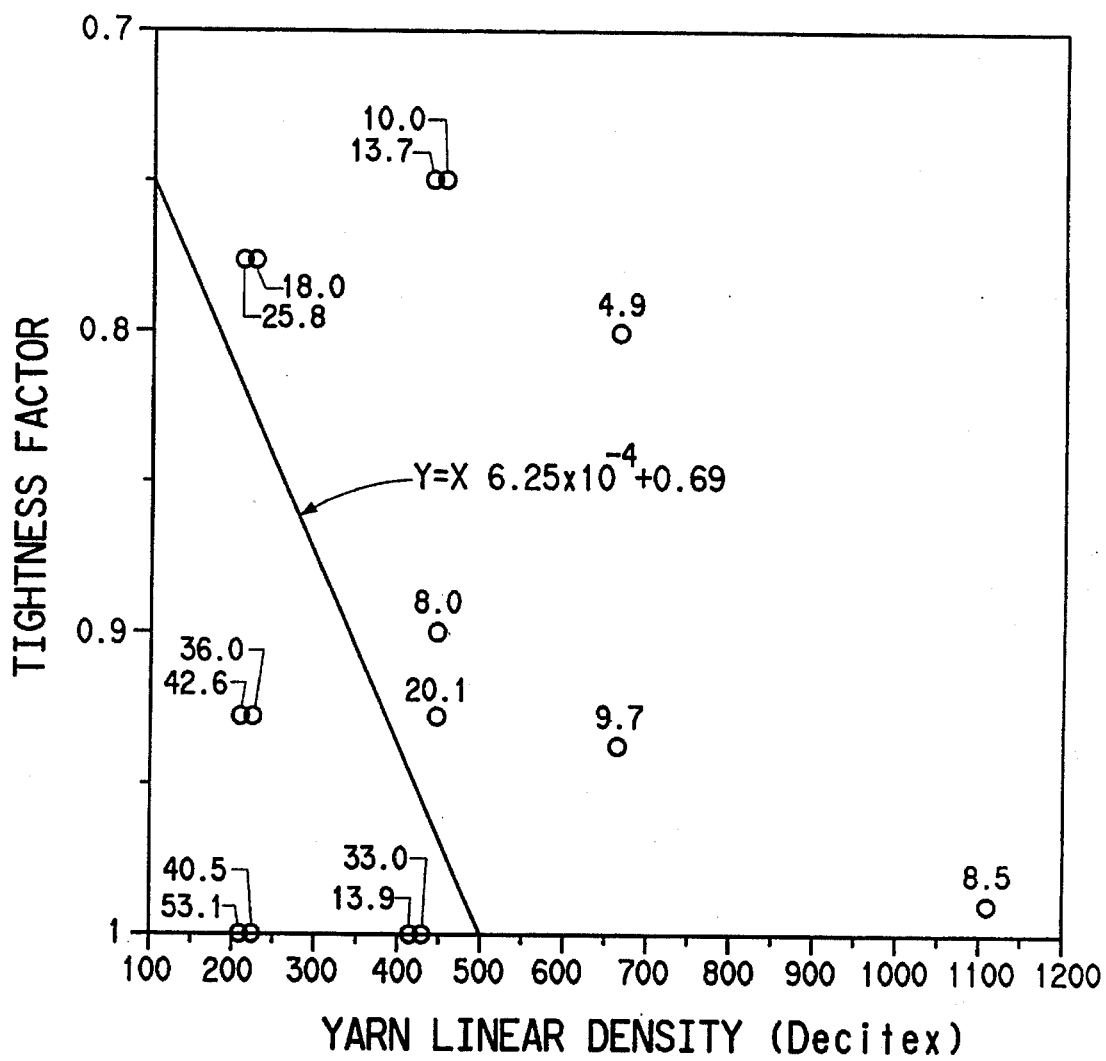
FIG. 2 is a graphical representation of the relationship between linear density for yarns and fabric tightness factors for fabrics which are penetration resistant.

Reference is made to FIG. 2 which is a graphical representation of data points from tests performed in the Supporting Example herein. Each point on the graph represents the test results from one fabric, is located by tightness factor of the fabric and linear density of the yarn, and is identified by the so-called specific penetration resistance determined in the test.

As will be explained later herein, specific penetration resistance decreases as resistance to penetration decreases and a value of about 30 for specific penetration in the tests conducted herein is considered to represent adequate penetration resistance for general use. The line identified as $Y = X \; 6.25 \times 10^{-4} + 0.69$ separates adequate penetration resistance from inadequate penetration resistance for fabrics in FIG. 2 made from aramid yarns.

There is one point on the "adequate penetration resistance" side of the line which exhibits inadequate penetration resistance; but that point represents a fabric made from yarn which was not aramid.

Good penetration resistance requires a combination of several yarn and fabric qualities, among which are yarn linear density and fabric tightness factor. From FIGS. 1 and 2, it can be seen that, for aramid fibers, improved penetration resistance will be afforded by fabrics with a combination of filament linear density which is less than 1.67 dtex, as shown in FIG. 1 and a tightness factor and yarn linear density which falls under the curve of FIG. 2 in the ranges of 0.75 to 1.0 and 500 to 100 decitex, respectively.

The aramid yarns used in this invention must have a high tenacity combined with a high elongation to break to yield a high toughness. The tenacity should be at least 19 grams per dtex (21.1 grams per denier) and there is no known upper limit for tenacity. Below about 11.1 grams per dtex, the yarn doesn't exhibit adequate strength for meaningful protection. The elongation to break should be at least 3.0 percent and there is no known upper limit for elongation. Elongation to break which is less than 3.0 percent results in a yarn which is brittle and yields a toughness which is less than necessary for the protection sought herein.

"Toughness" is a measure of the energy absorbing capability of a yarn up to its point of failure in tensile stress/strain testing. Toughness is sometimes, also, known as "Energy to Break". Toughness or Energy to Break is a combination of tenacity and elongation to break and is represented by the area under the stress/strain curve from zero strain to break. It has been discovered that a slight increase in tenacity or elongation to break results in a surprisingly large improvement in penetration resistance. A yarn toughness of at least 35 Joules/gram is believed to be necessary for adequate penetration resistance in practice of this invention; and a toughness of at least 38 Joules/gram is preferred.

A single layer of the woven article of this invention does provide a measure of penetration resistance and, therefore, a degree of protection; but a plurality of layers are usually used in an ultimate product. It is in the use of a plurality of layers that the present invention exhibits its most pronounced and surprising improvement. It has been discovered that articles of this invention, when placed together in a plurality of layers, afford a surprisingly effective penetration resistance when the articles are not affixed to one another, thereby permitting relative movement between adjacent layers. Adjacent layers or articles may be fastened at the edges or there may be some loose interlayer connections at relatively great spacings compared with the thickness of the articles. For instance, layer-to-layer attachments at point spacings of greater than about 15 centimeters would serve, for this application, as being substantially free from means for holding the layers together. Layers which have been stitched together over the surface of the layers may provide more effective ballistics protection; but such stitching causes immobility between the layers and, for reasons not entirely understood, actually decreases the penetration resistance of the layers as compared with expectations based on single layer tests.

TEST METHODS

Linear Density

The linear density of a yarn or a filament is determined by weighing a known length of the yarn or filament. "Dtex" is defined as the weight, in grams, of 10,000 meters of the material. "Denier" is the weight, in grams, of 9000 meters of the material.

In actual practice, the measured dtex of a yarn or filament sample, test conditions, and sample identifica-tion are fed into a computer before the start of a test; the computer records the load-elongation curve of the sample as it is broken and then calculates the properties.

Tensile Properties

Yarns tested for tensile properties are, first, conditioned and, then, twisted to a twist multiplier of 1.1. The twist multiplier (TM) of a yarn is defined as:

$$TM=(twists/cm)/(dtex)^{-1/2}/30.3=(twists/inch)(denier)^{-1/2}/73$$

The yarns to be tested are conditioned at 25° C., 55% relative humidity for a minimum of 14 hours and the tensile tests are conducted at those conditions. Tenacity (breaking tenacity), elongation to break, and modulus are determined by breaking test yarns on an Instron tester (Instron Engineering Corp., Canton, Mass.).

Tenacity, elongation, and initial modulus, as defined in ASTM D2101-1985, are determined using yarn gage lengths of 25.4 cm and an elongation rate of 50% strain/minute. The modulus is calculated from the slope of the stress-strain curve at 1% strain and is equal to the stress in grams at 1% strain (absolute) times 100, divided by the test yarn linear density.

Tenacity, elongation, and initial modulus of individual filaments are determined in the same way as for yarns; but filaments are not subjected to twist and a gage length of 2.54 cm is used.

Toughness

Using the stress-strain curve from the tensile testing, toughness is determined as the area (A) under the stress/strain curve up to the point of yarn break. It is usually determined employing a planimeter, to provide area in square centimeters; and, for aramids, which generally exhibit a nearly straight-line stress-strain curve, toughness can be estimated as one-half of the product of tenacity times elongation. Dtex (D) is as described above under "Linear Density". Toughness (To) is calculated as $$To=A \times (FSL/CFS)(CHS/CS)(1/D)(1/GL)$$

where

FSL=full-scale load in grams

CFS=chart full scale in centimeters

CHS=crosshead speed in cm/min

CS=chart speed in cm/min

GL=gauge length of test specimen in centimeters

Digitized stress/strain data may, of course, be fed to a computer for calculating toughness directly. The result is To in dN/tex. Multiplication by 1.111 converts to g/denier. When units of length are the same throughout, the above equation computes To in units determined only by those chosen for force (FSL) and D.

Penetration Resistance

Penetration resistance is determined on articles of a single layer or a few layers by a standard method for Protective Clothing Material Resistance to Puncture identified as ASTM F1342. In that test, the force is measured which is required to cause a sharply pointed puncture probe to penetrate a specimen. The specimen is clamped between flat metal sheets with opposing 0.6 cm holes and placed 2.5 cm below the puncture probe mounted in a testing machine set to drive the probe through the specimen at the holes in the metal sheets at a rate of 50.8 cm/minute. The maximum force before penetration is reported as the penetration resistance.

Penetration resistance is determined on a plurality of layers of the articles using either a tempered steel awl 18 centimeters (7 inches) long and 0.64 centimeter (0.25 inch) in shaft diameter having a Rockwell hardness of C-45 or an ice pick of the same length, a shaft diameter of 0.42 centimeter and a Rockwell hardness of C-42. The tests are conducted in accordance with HPW test TP-0400.02 (22 Jul. 1988) from H. P. White Lab., Inc. The test samples are impacted with the awl, weighted to 7.35 kilograms (16.2 pounds) and dropped from various heights.

EXAMPLES

Example 1

In this example, several fabrics were woven using 220 dtex (200 denier) aramid yarns having filaments of a variety of linear densities. The fabrics were plain weave with a yarn density of 70×70 ends, exhibiting a fabric tightness factor of 1.0.

The yarns were:

| YARN | Filament Linear Density (dtex) | Filament Tenacity (g/dtex) | Filament Elongation (%) | Toughness $\left(\frac{g/dex}{2}\right)$ |
|---|---|---|---|---|
| 1-1 | 1.67 | 25.4 | 3.8 | 0.483 |
| 1-2 | 2.50 | 24.6 | 4.0 | 0.492 |
| 1-3 | 5.00 | 22.1 | 3.8 | 0.420 |
| 1-4 | 1.22 | 24.2 | 3.9 | 0.472 |
| 1-5 | 0.83 | 24.5 | 3.7 | 0.453 |
| 1-6 | 0.83 | 23.6 | 3.6 | 0.425 |
| 1-7 | 1.67 | 23.2 | 4.0 | 0.464 |
| 1-8 | 0.83 | 23.1 | 4.0 | 0.462 |

Fabrics made from these yarns were tested for penetration resistance, as ten-ply configurations, in accordance with the falling awl procedure, as previously described. The penetration resistance test results are reported in Table 1 as minimum penetrating energy in Joules and as minimum penetrating energy in Joules normalized to the toughness of the yarn of the fabric identified herein as 1—1.

Penetration resistance was normalized to a constant yarn toughness to eliminate bias which would be introduced by toughness variations.

TABLE 1

| Yarn of the Fabric | Penetration Resistance Joules | Normalized Penetration Resistance Joules |
|---|---|---|
| 1-1 | 98.9 | 98.9 |
| 1-2 | 75.0 | 73.6 |
| 1-3 | 58.5 | 67.3 |
| 1-4 | 106.2 | 108.7 |
| 1-5 | 102.5 | 109.3 |
| 1-6 | 95.1 | 108.8 |
| 1-7 | 80.6 | 83.9 |
| 1-8 | 104.3 | 109.0 |

The Normalized Penetration Resistance for each fabric was plotted as a function of the filament linear density for yarns in the fabrics, and that plot is shown in FIG. 1. It is readily seen that fabrics made using yarns with filaments having a linear density greater than 2.0 dtex exhibit very low penetration resistance and fabrics made using yarns with filaments having a linear density less than 1.2 dtex exhibit very high penetration resistance. The penetration resistance of these fabrics increases rapidly from very low to very high as the linear density of filaments in the fabric yarns is decreased from 2.0 dtex to 1.2 dtex, and it appears that there is an inflection in the curve of the Figure at about 1.67 dtex.

All of the above was conducted at a constant, high, fabric tightness factor and using yarn of the same linear density. As previously stated, fabrics of high penetration resistance are made using yarns having a linear density of 100 to 500 decitex and a fabric tightness of greater than 0.75. This invention represents an improvement in the discovery that the penetration resistance can be increased even more by use of yarns having filaments with linear density less than 1.67 dtex. The preferred fabrics of this invention require a combination of yarns of 100 to 500 decitex made from filaments of less than 1.67 decitex and woven to a fabric tightness factor of greater than 0.75.

Supporting Example

In this example, several fabrics were woven using a variety of yarns in plain weave at a variety of fabric tightness factors.

The yarns were:

| Yarn | Tenacity (gm/dtex) | Elongation (%) | Energy to Break (Joules/gm) | Linear Density (dtex) |
|---|---|---|---|---|
| A | 30.1 | 3.4 | 41.2 | 220 |
| B | 25.4 | 3.0 | 31.2 | 220 |
| C | 26.6 | 3.2 | 33.9 | 440 |
| D | 25.5 | 3.4 | 34.2 | 1110 |
| E | 30.0 | 3.4 | 40.5 | 440 |
| F | 31.1 | 3.4 | 41.4 | 670 |
| G | 30.0 | 3.4 | 40.5 | 440 |
| H | 38.8 | 3.1 | 47.8 | 415 |

Yarns A–G are poly(p-phenylene terephthalamide) (PPD-T) yarns sold by E. I. du Pont de Nemours and Company.

Yarn A bears the trademark designation KEVLAR® 159.

Yarns B–D bear the trademark designation KEVLAR® 29.

Yarns E and F bear the trademark designation KEVLAR® 129.

Yarn G bears the trademark designation KEVLAR® LT.

Yarn H is high molecular weight linear polyethylene yarn sold by AlliedSignal under the trademark designation SPECTRA® 1000.

The fabrics were:

| Fabric # | Yarn Used | Yarn End Count (cm × cm) | Basis Wt. (g/m²) | Tightness Factor |
|---|---|---|---|---|
| S-1 | A | 27.6 × 27.6 | 128 | 1.0 |
| S-2 | A | 24.8 × 24.8 | 115 | 0.93 |
| S-3 | A | 19.7 × 19.7 | 89 | 0.78 |
| S-4 | B | 27.6 × 27.6 | 126 | 1.0 |
| S-5 | B | 24.8 × 24.8 | 115 | 0.93 |
| S-6 | B | 19.7 × 19.7 | 89 | 0.78 |
| S-7 | C | 19.7 × 19.7 | 182 | 1.0 |
| S-8 | D | 12.2 × 12.2 | 282 | 0.99 |
| S-9 | E | 17.3 × 17.3 | 159 | 0.93 |
| S-10 | E | 13.4 × 13.4 | 120 | 0.75 |
| S-11 | F | 14.6 × 14.6 | 206 | 0.94 |
| S-12 | F | 11.8 × 11.8 | 164 | 0.80 |
| S-13 | G | 13 × 13 | 125 | 0.75 |
| S-14 | G | 16 × 16 | 139 | 0.90 |
| S-15 | H | 20.1 × 19.7 | 173 | 1.0 |

All of the fabrics were tested, as one and two-ply configurations, in accordance with ASTM F1342, as previously described. The test results are reported in Table 2 as absolute penetration resistance (grams-force) and as specific penetration resistance (absolute/basis weight) for both one and two-ply configurations.

TABLE 2

| Fabric # | Tightness Factor | No. of Plies | Basis Wt. (g/m²) | Penetration Resistance Absolute (grams) | Penetration Resistance Specific Resist. | No. of Tests |
|---|---|---|---|---|---|---|
| S-1 | 1.0 | 1 | 128 | 6,800 | 53.1 | 3 |
|  |  | 2 | 256 | 15,400 | 60.2 | 3 |
| S-2 | 0.93 | 1 | 115 | 4,900 | 42.6 | 3 |
|  |  | 2 | 230 | 11,300 | 40.1 | 5 |
| S-3 | 0.78 | 1 | 89 | 2,300 | 25.8 | 6 |
|  |  | 2 | 178 | 4,400 | 24.7 | 3 |
| S-4 | 1.0 | 1 | 126 | 5,100 | 40.5 | 6 |
|  |  | 2 | 252 | 11,400 | 45.2 | 3 |
| S-5 | 0.93 | 1 | 114 | 4,100 | 36.0 | 9 |
|  |  | 2 | 229 | 8,100 | 35.4 | 7 |
| S-6 | 0.78 | 1 | 89 | 1,600 | 18.0 | 9 |
|  |  | 2 | 178 | 3,600 | 20.2 | 7 |
| S-7 | 1.0 | 1 | 182 | 6,000 | 33.0 | 9 |
| S-8 | 0.99 | 1 | 282 | 2,400 | 8.5 | 5 |
|  |  | 1 (repeat) |  | 2,200 | 7.8 | 3 |
| S-9 | 0.93 | 1 | 159 | 3,200 | 20.1 | 5 |
|  |  | 2 | 318 | 8,700 | 27.4 | 3 |
| S-10 | 0.75 | 1 | 120 | 1,200 | 10.0 | 5 |
|  |  | 2 | 240 | 3,900 | 16.2 | 3 |
| S-11 | 0.94 | 1 | 206 | 2,000 | 9.7 | 6 |
|  |  | 2 | 412 | 4,100 | 10.0 | 6 |
| S-12 | 0.80 | 1 | 164 | 800 | 4.9 | 6 |
|  |  | 2 | 328 | 2,600 | 7.9 | 6 |
| S-13 | 0.75 | 1 | 139 | 1,900 | 13.7 | 6 |
| S-14 | 0.90 | 1 | 125 | 1,000 | 8.0 | 6 |
| S-15 | 1.0 | 1 | 173 | 2,300 | 13.3 | 6 |
|  |  | 2 | 346 | 4,600 | 13.3 | 6 |

Specific penetration resistance values for the single ply configurations from those tests were placed on a graphical field of yarn decitex versus fabric tightness factor, as shown in FIG. 2. The values fall into two easily-characterized areas. On one side of a line of the equation $Y = X \cdot 6.25 \times 10^{-4} + 0.69$ (where Y is tightness factor and X is linear yarn density in decitex) the fabrics have adequate penetration resistance; and, on the other side of the line, penetration resistance is inadequate.

From these test results, it is seen that penetration resistant fabrics are made from yarns of aramid having linear yarn density from 100 to 500 decitex and which are woven to a fabric tightness factor of at least 0.75 in accordance with the following formula:

$$Y = or > X \cdot 6.25 \times 10^{-4} + 0.69$$

wherein Y=Fabric Tightness Factor and X=Linear Yarn Density.

What is claimed is:

1. A flexible, penetration resistant, article consisting essentially of fabric woven to a fabric tightness factor of at least 0.75 from aramid yarn having a linear density of less than 500 dtex, a toughness of at least 30 Joules/gram, and made from filaments having a linear density of less than 1.67 dtex, wherein the relationship between the fabric tightness factor and the linear density of the yarn is $$Y = or > X \cdot 6.25 \times 10^{-4} + 0.69$$

wherein Y=fabric tightness factor and X=linear yarn density.

2. The penetration resistant article of claim 1 wherein at least two layers of the fabric are included in the article, are joined at edges of the article, and are otherwise substantially free from means for holding the layers of fabric together.

3. The article of claim 1 wherein the fabric tightness factor is substantially 1.0.

4. The article of claim 1 wherein the toughness is at least 40 Joules/gram.

5. The article of claim 1 wherein the aramid yarn is poly(p-phenylene terephthalamide).

* * * * *